April 28, 1931.  R. S. BLAIR  1,802,625
CONSTRUCTION FOR ICE WAGONS AND OTHER VEHICLES
Filed Aug. 19, 1922
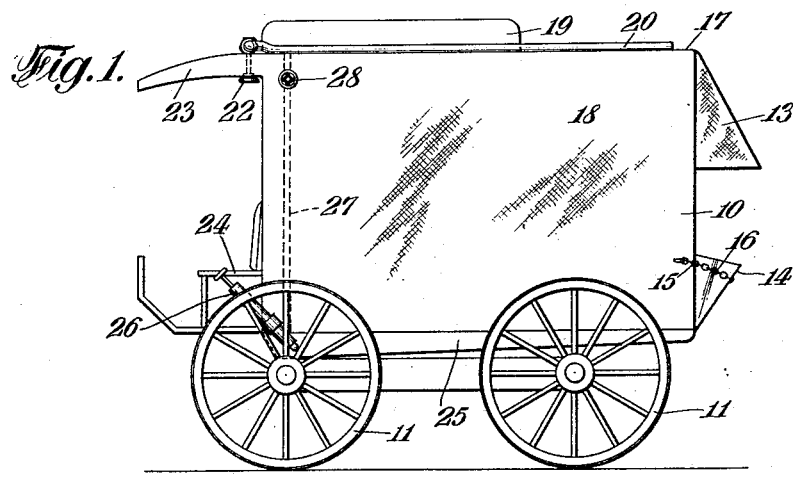
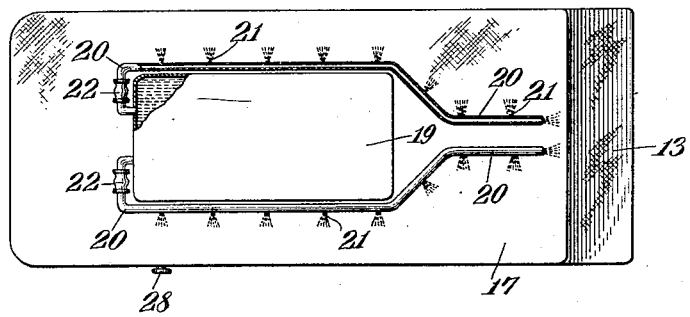
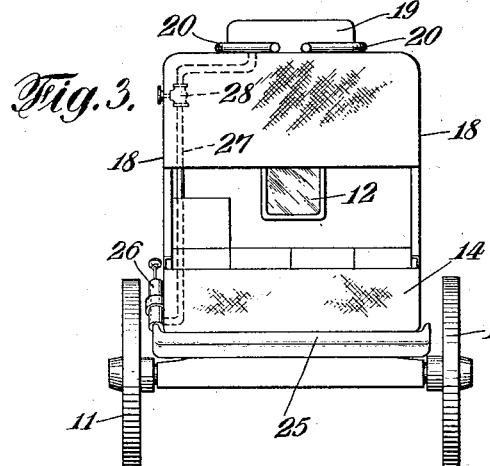
Inventor
Robert S. Blair Patented Apr. 28, 1931

1,802,625

UNITED STATES PATENT OFFICE

ROBERT S. BLAIR, OF STAMFORD, CONNECTICUT

CONSTRUCTION FOR ICE WAGONS AND OTHER VEHICLES

Application filed August 19, 1922. Serial No. 582,993.

This invention relates to construction for ice-wagons and other similar vehicles. One of the objects thereof is to provide a vehicle of the above nature the interior of which is adapted to be kept cool to the benefit of material to be carried therein. Another object is to provide a construction of the above nature adapted to convey ice or other frozen material in an efficient manner with a minimum amount of waste. Another object is to provide means readily attachable to a vehicle for simply and dependably cooling the interior thereof. Other objects will be in part obvious and in part pointed out hereinafter.

The invention accordingly consists in the features of construction, combinations of elements and arrangement of parts, and in the art which will be exemplified in the structure hereinafter described and the scope of the application of which will be indicated in the following claims.

In the accompanying drawings in which is shown one of the various possible embodiments of this invention, Figure 1 is a side elevation of an ice-wagon;

Figure 2 is a plan view of the same; and

Figure 3 is a rear end elevation.

Similar reference characters refer to similar parts throughout the several views of the drawings.

Referring now to the drawings in detail there is shown a vehicle such as an ice-wagon which comprises a box-like body 10 mounted upon wheels 11. The front end of the body 10 is preferably closed and provided with a window 12 shown in Figure 3. The rear end of the body 10 is provided with an overhanging canopy 13 to partially close the same and yet permit ready access to the interior of the body. There is also provided a swinging end-board 14 pivoted to the bottom portion of the body 10 and held at the desired angle as by means of a chain 15. At either side of the end-board 14 between the end-board and the body 10 is preferably positioned a folding sector 16 of pliable material such as canvas which closes the space between the end-board 14 and the body 10 at these points when the end-board is left in a position such as that shown in Figure 1, thus preventing access of drafts of air around the ends of the end-board 14 and to the lower portions of the ice or other material carried within the body 10.

The exterior surface of the body 10 including the top 17, sides 18 and canopy 13 are covered with an absorbent material such as heavy canvas for example. Positioned upon the top 17 of the body 10 is a suitable tank or reservoir 19 adapted to hold a supply of water and connected to the front end of the tank 19 are a pair of pipes 20 which extend about the tank 19 and, resting upon the top 17, extend rearwardly to a point adjacent the rear end of the body, as shown in Figure 2. Each of the pipes 20 is provided with a plurality of openings 21 preferably facing outwardly toward the sides of the body 10, and is also provided with an open end. The openings 21 remote from the junction of the pipe 20 and the tank 19 are larger than the openings 21 nearer to the tank, as clearly shown in Figure 2, the object being to proportion the openings so that there will be a nearly uniform flow of water from each. In each pipe 20 adjacent the front end of the tank 19 is placed a valve 22 whose handle preferably extends downwardly through the canopy 23 over the driver's seat 24 and are thus readily accessible to the driver.

Thus by opening the valves 22 water is led from the tank 19 through the pipes 20 and distributed over the top 17 and down over the sides 18 and the rear canopy 13 and the canvas or other absorbent material thereon is saturated. The valves 22 are then closed and the water in the saturated absorbent covering will commence to evaporate. It is readily understood that water in evaporating takes heat from surrounding objects and in this instance the evaporating water from the exterior absorbent covering, takes heat from the interior of the body 10 with a resultant cooling of the atmosphere therein. The evaporation and hence the cooling effect will be especially pronounced when the vehicle is in motion. When the water has been completely evaporated from the surface of the body, the valves 22 may be re-opened and the process repeated.

Mounted beneath the body 10 is a drip tank 25 which preferably extends the entire length of the body as shown in Figure 1 and the sides of which extend upwardly somewhat about the sides 18 of the body 10 as shown in Figure 3. The drip tank 25 will thus catch any water that drips down from the exterior of the sides 18 and will also catch any water resulting from melting ice within the body 10. The tank 25 is preferably made deeper at its forward end as shown in Figure 1 and connected thereto is a hand pump 26 mounted on the outside of the body 10 and readily accessible from the driver's seat 24. By means of the pump 26, water collected in the tank 25 may be pumped through a pipe 27 and into the tank 19. The pump 26 is preferably provided with a screened inlet to prevent the access of dirt through the pump to the tank 19. A valve 28 is provided in the pipe 27 to prevent backward flow of water from the tank 19 when the pump 26 is not being operated.

It will thus be seen that there is at the ready disposal of the driver of the vehicle, means for effectually cooling the interior of the vehicle in a simple and convenient manner. The above described apparatus is simple in operation and inexpensive in construction and well adapted to meet the requirements of practical use.

As various possible embodiments might be made of the above invention and as various changes might be made in the embodiment and art above set forth, it is to be understood that all matter herein set forth or shown in the accompanying drawings is to be interpreted as illustrative and not in a limiting sense.

I claim as my invention:—

1. In construction for ice-wagons and the like, in combination, a body, a top portion extending over the body and adapted to protect its contents from the sun, comprising a member of absorbent material forming its outermost surface at the top and sides and directly exposed to the sun and outer air, means adapted to maintain said member in moistened condition whereby evaporation therefrom is accelerated by such exposure, means closing the forward end of said body, and means extending downwardly from the rear end of said top portion covered by said absorbent member whereby the escape of air from said body is retarded and the area of said absorbent member is increased.

2. In apparatus of the class described, in combination, means forming a chamber, means adjacent said chamber adapted to collect drip-water from melting ice, an absorbent member adjacent said chamber, and means adapted to lead said drip-water upwardly to the top of said absorbent member whereby it is moistened and the cooling effect of evaporation therefrom utilized in said chamber.

3. The herein described art of cooling vehicles which consists in collecting drip water from melting ice in said vehicle spreading said water over a surface covering said vehicle and evaporating said drip-water in operative relation thereto whereby the cooling effect of said evaporation is utilized in the interior of the vehicle.

4. In construction for ice-wagons and the like, in combination, a vehicle body, a container mounted on the top thereof and adapted to hold water, means connected to said container adapted to distribute said water over the exterior surface of said body, means upon said body for entrapping said water having traversed the exterior surface of said body, and means for returning said entrapped water from said last means to said container.

5. In a construction for ice wagons and the like, in combination, a substantially enclosed vehicle body, an end board pivoted to the floor portion thereof, and a connection between the sides of said end board and said body adapted to bridge tightly the space therebetween in all positions of said end board, and prevent the leakage of air therefrom.

6. In construction for ice-wagons and the like, in combination, a body, a top portion extending over the body and adapted to protect its contents from the sum, comprising a member of absorbent material forming its outermost surface at the top and sides and directly exposed to the sun and outer air, means adapted to collect drip-water from melting ice in the wagon, and means adapted to pump said drip-water onto said absorbent member whereby the evaporation thereof tends to cool the interior of said wagon body.

7. In construction for ice-wagons and the like, in combination, an ice-containing body closed at the forward end and having a partially closed rear end with an opening therein, a top portion extending over the body and adapted to protect its contents from the sun, said top portion comprising a member of absorbent material forming its outermost surface at the top and sides and directly exposed to the sun and outer air, a source of water supply, separate conduits leading from said source of supply to different areas of said member, whereby evaporation therefrom is accelerated by such exposure and the cooling effect of evaporation utilized to retard the melting of the ice, and separate means adapted to control the moistening of different portions of the surface of said absorbent material at will.

8. The herein described art of cooling, which consists in enclosing a solid frozen substance, leading the fluid produced by the action of heat on said substance about the sides and over the top of the space in which said substance rests and thereby cooling the space in which said substance rests, and freeing said fluid in the form of vapor and thereby utilizing its latent heat of evaporation.

9. The herein described art of cooling, which consists in enclosing a solid frozen substance, leading the fluid produced by the action of heat on said substance entirely about the same on both sides and the top and bottom thereof and thereby cooling the space in which said substance rests, and ultimately freeing said fluid in the form of vapor, whereby the latent heats of melting and evaporation of the substance are utilized.

10. In cooling apparatus, in combination, means forming a chamber containing a solid frozen substance, means adapted to conduct the fluid produced by the action of heat on said substance along the outside of the side walls of said chamber and over the top thereof to cool the interior thereof and free the same in the form of vapor, and means adapted to lead said products from said chamber to said conducting means.

In testimony whereof, I have signed my name to this specification this 12th day of August, 1922.

ROBERT S. BLAIR.